(12) United States Patent
Tisse

(10) Patent No.: US 7,416,302 B2
(45) Date of Patent: Aug. 26, 2008

(54) RING LOCATION

(75) Inventor: Christel-Loic Tisse, Plan de Cuques (FR)

(73) Assignee: STMicroelectronics S.A., Montrouge (FR)

( * ) Notice: Subject to any disclaimer, the term of this patent is extended or adjusted under 35 U.S.C. 154(b) by 561 days.

(21) Appl. No.: 10/489,544

(22) PCT Filed: Sep. 13, 2002

(86) PCT No.: PCT/FR02/03136

§ 371 (c)(1),
(2), (4) Date: Mar. 12, 2004

(87) PCT Pub. No.: WO03/025841

PCT Pub. Date: Mar. 27, 2003

(65) Prior Publication Data

US 2004/0252865 A1    Dec. 16, 2004

(30) Foreign Application Priority Data

Sep. 14, 2001  (FR) .................................. 01 11925

(51) Int. Cl.
*A61B 3/14* (2006.01)
*A61B 3/10* (2006.01)
(52) U.S. Cl. ...................................... 351/209; 351/205
(58) Field of Classification Search .......... 351/200–211
See application file for complete search history.

(56) References Cited

U.S. PATENT DOCUMENTS

| 4,641,349 A | * | 2/1987 | Flom et al. ................... 382/117 |
| 5,016,282 A | * | 5/1991 | Tomono et al. ............. 382/117 |
| 5,291,560 A |   | 3/1994 | Daugman |

OTHER PUBLICATIONS

International Search Report from corresponding International Application No. PCT/FR02/03136, filed Sep. 14, 2002.
Daugman, J., *High Confidence Recognition of Persons by Rapd Video Analysis of Iris Texture*, Ecos. European Convention on Security and Detection, May 16, 1995, pp. 244-251, XP000671918.

(Continued)

*Primary Examiner*—Mohammed Hasan
(74) *Attorney, Agent, or Firm*—Lisa K. Jorgenson; James H. Morris; Wolf, Greenfield & Sacks, P.C.

(57) ABSTRACT

The invention concerns a method for locating, in a digital image, a circle centre comprising the following steps: a) predefining a set of potential radii of the circle; b) dimensioning (303) two accumulators to a dimension in the form of a column matrix not larger than the size of the image in x-axis and a line matrix not larger than the size of the image in y-axis; c) sequentially, for each pixel image of the image: (i) selecting successively each potential radius; (ii) evaluating the position of the potential center of a circle of the selected radius and whereof the pixel concerned is on the periphery; and (iii) incrementing accumulators at the x-axis and the y axis of the potential center; and d) selecting (304) as coordinates of the located centre, the x-axis and the y-axis corresponding to the maximum of accumulators.

19 Claims, 3 Drawing Sheets

OTHER PUBLICATIONS

Benn, D.E., et al., *Robust Eye Centre Extraction Using the Hough Transform*, Audio-and Video-Based Biometric Person Authentication, Mar. 12, 1997, pp. 3-9, XP001020856.

Wildes, R.P., *A System for Automated Iris Recognition*, Applications of Computer Vision, 1994, Proceedings of the second IEEE Workshop on Sarasota, FL, Dec. 5-7, 1994 pp. 121-128, XP010100093.

Illingworth, J., et al., *The Adaptive Hough Transform*, IEEE Transactions on Pattern Analysis and Machine Intelligence, IEEE Inc., New York, vol. 9, No. 5, Sep. 1, 1987, pp. 690-698, XP000573820.

Kim, M.H., et al., *A New Memory Model for the Parameter Space in the Hough Transform: Projection Arrays*, Computers and Communications Technology Toward 2000. Seoul, Aug. 25-28, 1987, Proceedings of the Region 10 Conference, (Tencon) New York, IEEE, vol. 1, Conf. 3, pp. 222-226, XP000011268.

Kimme, C., et al., *Finding Circles by an Array of Accumulators*, Comm of the Assoc for Computing Machinery, vol. 18, No. 2, Feb. 1995, pp. 120-122, XP002196698.

Chan, R., et al., *New Parallel Hough Transform for Circles*, IEE Proceedings E., Computers & Digital Techniques, Inst. of Elec. Engineers. Stevenage, GB, vol. 138, No. 5, Sep. 1, 1991, pp. 335-344, XP000261988.

Conker, R.S., *Ai Dual Plane Variation of the Hough Transform for Detecting Non-concentric Circles of Different Radii*, Computer Vision Graphics and Image Processing, Academic Press, Duluth, MA vol. 43, No. 2, Aug. 1, 1988 pp. 115-132, XP000004394.

Atiquzzaman, M., *Coarse-to-Fine Search Technique to Detect Circles in Images*, Intern'l Journal of Advance Mfg. Tech, 1999, Springer-Berlag, UK, vol. 15, No. 2, pp. 96-102, XP001148706.

Tisse, C-L, et al., *Person Identification Technique Using Human Iris Recognition*, 15th Int. Conf. on Vision Interface, 'enligne! May 27-29, 2002, XP002231650.

\* cited by examiner

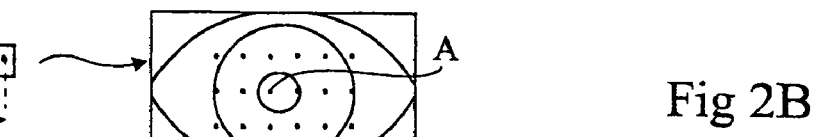
Fig 2A
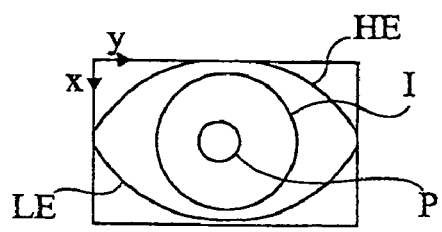
Fig 2B
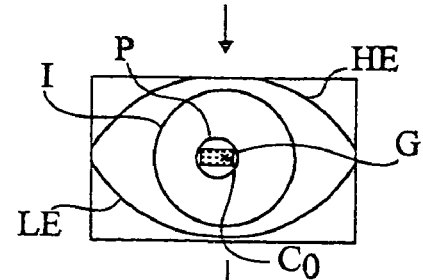
Fig 2C
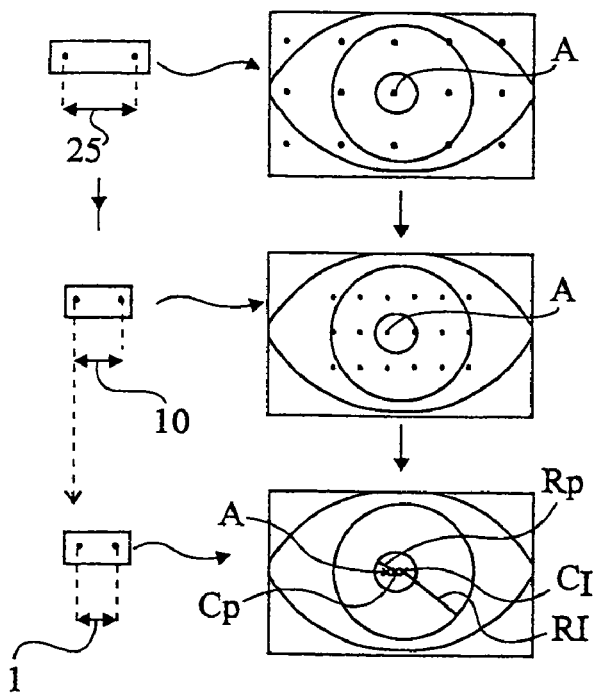
Fig 4A
Fig 4B
Fig 4C
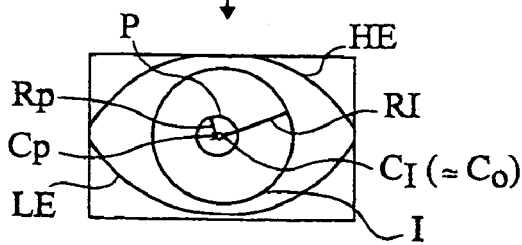
Fig 4D

RING LOCATION

BACKGROUND OF THE INVENTION

1. Field of the Invention

The present invention relates to the localization, in a digitized image, of a ring-shaped surface included between two substantially concentric geometric shapes of generally circular shape. More specifically, the present invention relates to the detecting of a ring extending between two circles of different radiuses, the circle having the smaller radius being strictly included in the circle of greater radius.

2. Discussion of the Related Art

An example of application of the present invention is the localization of the iris of an eye in a digitized image. Indeed, an eye may be characterized as being an assembly of substantially concentric elliptic geometric shapes: the eyebrows define a contour that is followed by eyelashes, which surround the eye ground, which includes a substantially circular iris containing a substantially circular pupil. In such an approximately concentric pattern, the position of the centers and radiuses of the two circular patterns of the pupil and of the iris is desired to be extracted, to extract from the image the ring forming the iris. For clarity, it is considered in the following description that the limits of the pupil and of the iris are perfect circles.

FIG. 1 illustrates, in a flowchart, an example of a known method for localizing an iris of an eye. FIGS. 2A to 2C illustrate the digital image which is the object of the method at different steps of the implementation thereof.

Such a method starts with a step 101 (ACQUIRING EYE IMAGE) in which a digital image of an eye is acquired. The eye is digitized so that the obtained image is full size (scale 1:1). Such an image may be obtained by any biometry terminal enabling capturing an eye image. For example, the acquisition is performed by a CCD digital camera of a 580×760-pixel image, in black and white by infrared illumination, the eye being placed at a few centimeters only of the camera.

Localizing an iris in such an image then consists of localizing the center and the radius of the pupil as well as the center and the radius of the iris. Indeed, although the pupil is strictly included in the iris, its is generally slightly off-centered with respect thereto.

A known method for determining the centers of the pupil and of the iris and their radiuses is based on the following observation. In infrared illumination, on the one hand, the iris contrasts on the white of the eye. On the other hand, the contour of the pupil contrasts with respect to the peripheral iris. This contrast translates on the digital image as very different levels of grey on either side of the limit between the iris and the cornea, on the one hand, and of the limit between the iris and the pupil, on the other hand. The gradient, in terms of levels of grey, of the points located on the iris or pupil contour is then very high. Generally, the contrast between the pupil and the iris is greater than the contrast between the iris and the cornea.

Localizing the iris consists of successively considering each point in the image as the possible center and of measuring the gradients of the points located on arcs of a circle centered on the considered possible center. The radiuses of these arcs of a circle vary within a range of possible radiuses of a pupil or of an iris at the considered digitization scale. For a 580×760-pixel image at scale 1:1, the pupil diameter is considered to range between 30 and 100 pixels, and the iris diameter is considered to range between 100 and 180 pixels. The center of the pupil or of the iris then is the point for which, in the radius range corresponding to the pupil, respectively, to the iris, the gradient variation is the most significant. The gradient variation calculations are performed by means of integro-differential operators.

To reduce the amount of calculation and the processing time, the integro-differential operators are applied, at step 102 (LOCATING IRIS) which follows acquisition 101, to successive grids of points representing possible centers. The successive grids have decreasing dimensions and pitches. Thus, in a first iteration 103 (i=0, s=$s_0$), it is for example chosen to apply on the digitized image illustrated in FIG. 2A a first grid of dimensions close to those of the image and of a relatively large first pitch $s_0$, for example, $s_0$=25 pixels, that is, including a possible center every 25 pixels in both directions. Further, the centers of the iris and of the pupil being confounded or slightly off-centered, the center and contour of the sole pupil are first localized by applying the operators on arcs of a circle having diameters varying from 30 to 100 pixels.

At the next iteration i=1, the grid pitch is reduced to refine the center determination. This pitch reduction goes along with a reduction of the grid dimensions and a centering thereof in the region of highest gradient variations. As illustrated in FIG. 2B, it is considered, for example, that for second iteration i=1, pitch $s_1$ is 10 pixels. If the number of points in the grid is constant, its size reduction is automatic with the pitch reduction.

Again, the integro-differential operators are applied for each point in the grid and the existence of a center or of a region in which, for several points, the gradient variation (levels of grey) is the strongest is detected.

For each iteration i and each corresponding pitch $s_i$, the process is thus repeated by applying in a block 104 (INTEGRO-DIFFERENTIAL OPERATOR) the integro-differential operators on grids of decreasing pitch $s_i$ and of more and more reduced dimensions.

After each passing through block 104, a possible center and radius are obtained for the pupil at block 105 (CENTER & RADIUS), which are included in the grid of smaller pitch at the next iteration.

It is controlled at the following step 106 (i=V? $s_i$=$S_V$?) whether a precision criterion is achieved. This criterion is defined by a number V of iterations or a pitch $S_V$ of the grid for which the obtained center and radius are considered as being localized in a sufficiently accurate manner.

If not (N), a new grid of reduced dimensions and of smaller pitch, centered on the region for which the strongest gradient variation has been observed at the preceding iteration is redefined at step 107 (NEW GRID, i=i+1, $s_i$=$s_{i+1}$).

Generally, the process carries on until a maximum accuracy, that is, a grid having a pitch of one pixel, is reached, as illustrated in FIG. 2C. Such an accuracy enables exact determination of center $C_P$ and radius $R_P$ of the pupil.

Once precision test 106 is positive (Y), the iris is localized at the next step 108 (IRIS) by applying again a grid of possible centers to determine with the integro-differential operators the iris radius $R_I$ and, should the case arise, discriminate its center $C_I$ from center $C_P$ of the pupil with a maximum reliability. The operators are here applied on arcs of a circle having diameters ranging from 100 to 180. Since the circles are approximately concentric, it is not necessary to start again from a grid having the maximum pitch. A reduced number of iterations (or even a single iteration) may be used by centering on the center of the pupil a grid sized according to the maximum (physiologically) possible interval between the two centers. Such a center localization and radius determination of a second circle after localizing a first circle is described in U.S. Pat. No. 5,291,560, which is incorporated herein by reference.

The iris surface, that is, the ring-shaped surface between the pupillary circle of center $C_P$ and of radius $R_P$ and the iridian circle of center $C_I$ and of radius $R_I$, is then determined with a maximum accuracy.

The surface thus obtained may be submitted to any appropriate digital processing. In the considered example of an iris, it generally is an iridian recognition method based on the matching 109 (MATCHING) of features extracted from the obtained surface, for example, in one of the ways described in above-mentioned U.S. Pat. No. 5,291,560 or in above-mentioned U.S. Pat. No. 5,572,596, or in international patent application WO 00/62239, all of which are incorporated herein by reference.

Generally, the method described in relation with FIGS. 1 and 2 enables localizing at least one circle by exact determination of its radius and of the position of its center.

A major disadvantage of such a method is the successive repetition of the same operations on grids of decreasing size and pitch. This imposes a great amount of calculation. Further, for a given point, for example, point A of FIG. 2A close to the searched centers, the calculations are repeated a great number of times. Accordingly, such a method has a slow implementation.

Further, the various gradient variation comparison operations and the corresponding calculations impose a relatively complex and bulky software structure. Further, at each iteration, for each possible center, the obtained data must be stored to be compared to those obtained for the other possible centers, to determine the region(s) of strongest gradient variation. This is necessary to recenter the next grid at step 107. Such a method thus requires using a significant memory surface.

In a completely different field, to recognize the presence of a face in a digitized image, a method for determining the presence of a cornea or of an iris has been provided to identify the presence of an eye and calculate a spacing between two eyes. This method consists of searching concentric geometric shapes by means of a Hough transform such as described in U.S. Pat. No. 3,069,654. which is incorporated herein by reference. Such a method consists of considering, for the involved geometric shape (here, a circle), each pixel of the digitized image as being at the periphery of a circle of a given perimeter (radius), and of approximately localizing the center of this circle. For each possible diameter of the searched circuit, an accumulator of same dimensions as the image is associated with the digitized image. Each accumulator memorizes, for a given radius, the number of times when a given point of the digitized image is determined as being the possible center of the searched circle. This is performed by incrementing, for each radius, an initially null weight assigned, in the accumulator linked to this radius, to the position of the possible center in the image.

The searched center and radius are then obtained by determining, for each considered radius, the point having the greatest weight and, for the different considered radiuses, that for which the possible center has the maximum weight with respect to the other possible centers determined by the first determination. Such a method is described, for example, in article "Detection of eye locations in unconstrained visual images" by R. Kothari and J. L. Mitchell, published in Proc. ICIP'96, III pp. 519-523 (1996), or in article "Eye spacing measurement for facial recognition" by M. Nixon, published in SPIE Proc., 575, pp. 279-285 (1985), both of which are incorporated herein by reference.

Such a method has the disadvantage of being also long to execute. Further, for each pixel in the image, it imposes using a bulky memory, since, for each possible radius, an array having a number of lines and columns equal to the number of lines and columns of the digitized image must be memorized.

SUMMARY OF THE INVENTION

The present invention aims at providing a method for accurately locating the center of at least two concentric circles, which is faster than known methods.

The present invention also aims at providing such a method of which the implementation requires a reduced memory space as compared to the space required by the implementation of known methods.

The present invention also aims at providing such a method which also applies to the localization of several circles, each of which is strictly included in a circle of larger radius, but which are not concentric.

The present invention also aims at providing a method for localizing a ring included between two circles.

The present invention also aims at providing such a method which is applicable to the localization of an iris of an eye in a digitized image.

To achieve these and other objects, the present invention provides a method for localizing, in a digital image, at least two circles, one of which is strictly included in the other by determination of their radiuses and of the coordinates of their centers by means of integro-differential operators applied to at least one grid of possible centers, including the steps of:

evaluating an approximate position of the center of one of the two circles; and centering the grid in the vicinity of the approximate center, the grid being of reduced dimensions as compared to the image dimensions.

According to an embodiment of the present invention, the method uses a single grid having a minimum pitch.

According to an embodiment of the present invention, the maximum size of the grid is smaller than the size of the larger circle.

According to an embodiment of the present invention, the maximum size of the grid is smaller than the size of that of the circles forming the limit of strongest contrast.

According to an embodiment of the present invention, the maximum size of the grid is smaller than the size of the smaller circle.

According to an embodiment of the present invention, the step of evaluation of the approximate position of the center includes the steps of:

a) predefining a set of possible radiuses of the circle;

b) sizing two one-dimension accumulators in the form of a column array of at most the image size in abscissa and of a line array of at most the image size in ordinate;

c) successively, for each image pixel:

i) successively selecting each possible radius;

ii) evaluating the position of the possible center of a circle of the selected radius and the considered pixel of which is on the periphery; and iii) incrementing the accumulators at the abscissa and ordinate of the possible center; and d) selecting, as coordinates of the located center, the abscissa and the ordinate corresponding to the maximum of the accumulators.

According to an embodiment of the present invention, the increment is one.

According to an embodiment of the present invention, the increment is weighted according to the significance of the gradient at the considered pixel.

The present invention also provides a method for localizing, in a digital image, a ring defined by the inclusion of a first circle of relatively small radius in a second circle of relatively large radius, consisting of localizing the first and second circles according to the method of any of the preceding embodiments.

According to an embodiment of the present invention, the ring is the iris of an eye, the first circle being the pupil of the eye and the second circle being the limit between the iris and the eye cornea.

According to an embodiment of the present invention, the pupil is that of the circles of which the center is approximately searched.

The foregoing objects, features and advantages of the present invention, will be discussed in detail in the following non-limiting description of specific embodiments in connection with the accompanying drawings.

BRIEF DESCRIPTION OF THE DRAWINGS

FIGS. 2A to 2C schematically and partially illustrate the implementation of the method of FIG. 1;

FIGS. 4A to 4D illustrate the implementation of the method of FIG. 3.

DETAILED DESCRIPTION

For clarity, the same elements have been designated with same references in the different drawings. Further, FIGS. 2A to 2C and 4A to 4D are not drawn to scale.

A mode of iris recognition and location by determining the pupillary and iridian radiuses and by localizing the centers of the pupil and of an iris of an eye according to the present invention is described hereafter in relation with FIGS. 3 and 4A to 4D.

The method starts with a step 301 (ACQUIRING EYE IMAGE) of acquisition of an eye image. Preferably, such an acquisition is performed so that the obtained image exhibits dimensions very close to the model, that is, a scale as close to one as possible. Such an acquisition may be performed by means of an appropriate conventional biometry terminal, for example, the device described in document EP-A-0,973,122, which is incorporated herein by reference.

FIG. 4A illustrates an image of an eye obtained by acquisition 301 by a digital CCD camera having a 580×760-pixel image, the eye being placed at a few centimeters only of the camera and being submitted to an infrared illumination. The obtained image includes a pupil P, an iris I, a cornea limited by a higher eyelid HE and a lower eyelid LE.

The method according to the present invention carries on with the approximate localization of the eye center, that is, of the center of the pupil or of the iris. Preferably, the center of the circle exhibiting the strongest contrast is approximately located. As indicated previously, in infrared illumination, the contrast is generally higher between the pupil and the iris than between the iris and the cornea. Preferably, the center of the pupil is thus first approximately located. The approximate localization enables determining an approximate center which is, with respect to the real searched center, at a distance of at most five pixels.

According to a first embodiment of the present invention, not shown, the approximate center is determined by means of any known method. For example, one can use the method disclosed in the article "A new memory model for the parameter space in the Hough transform: Projection arrays" of M. H. Kim and H. Y. Hwang published in Proceedings TENCON 87, IEEE region 10 conference "Computers and Communications Technology Toward 2000", Aug. 25-28, 1987, Volume 1, pages 222-226.

Figure 3:
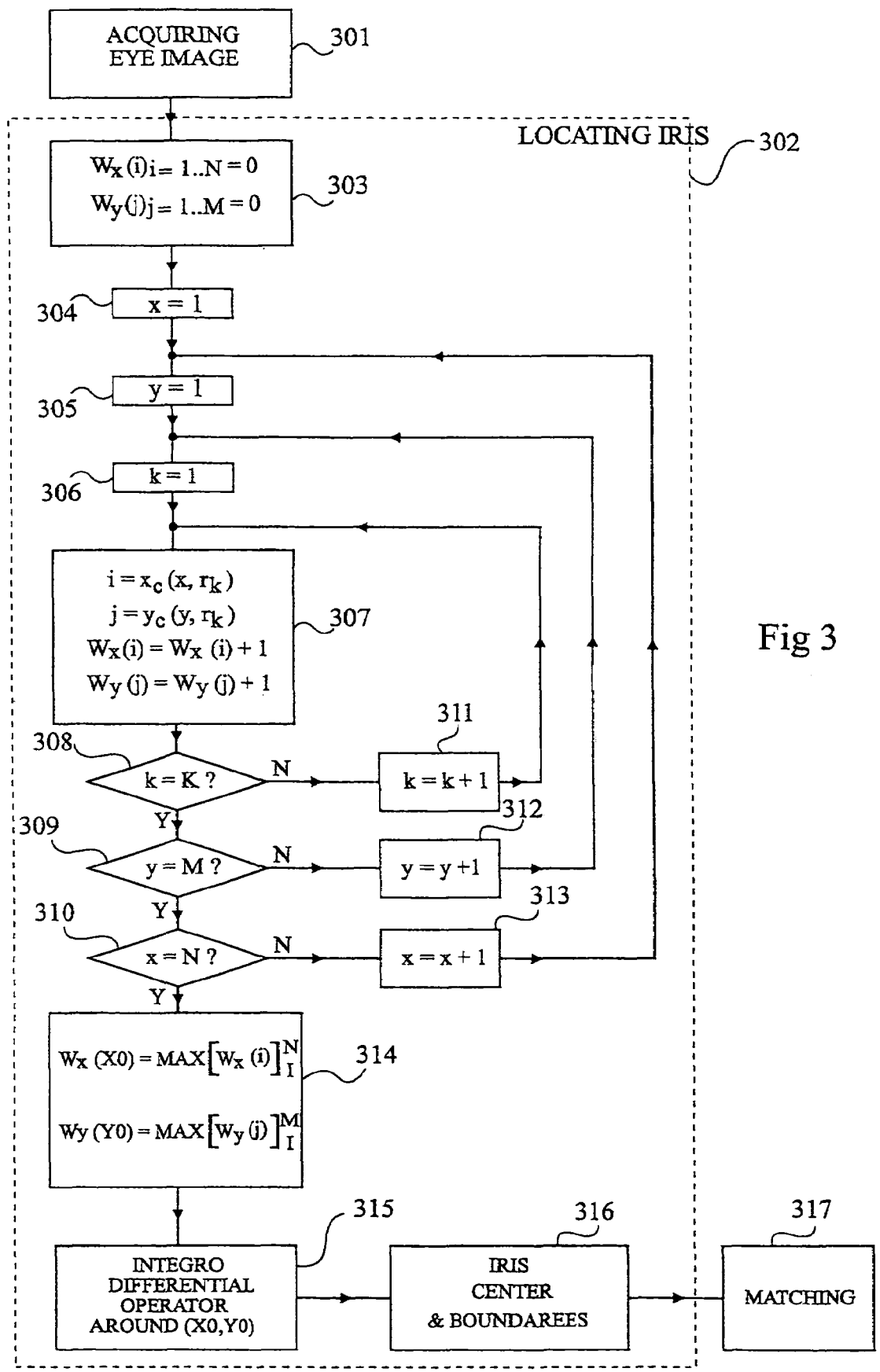
FIG. 3 illustrates in a flowchart the step sequence of an iridian recognition method according to an embodiment of the present invention.

According to a preferred embodiment of the present invention, the approximate center is determined by means of a method, an algorithm of which is described hereafter in relation with FIG. 3.

As illustrated in block 302 (LOCATING IRIS) of FIG. 3, two one-dimensional accumulators $W_x$ and $W_y$ are first generated. The dimension of a first accumulator $W_x$ is number N of lines of the image being processed. The dimension of the second accumulator $W_y$ is number M of image columns. In a first sub-step 303, all current elements of the first and second accumulators $W_x(i)$ where i varies from 1 to N, and $W_y(j)$, where j varies from 1 to M, are set to zero.

The system is initialized to be placed at the first line (block 304, x=1), on the first column (block 305, y=1) and consider a first (block 306, k=1) possible radius.

The localization is performed by successively implementing for each of the N lines x, for each point $P_{xy}$ at the intersection of current line x and of a column y among the M columns, the following operations (block 307):

calculating components $Grad_x$ and $Grad_y$ of the gradient of current point $P_{xy}$, that is, comparing the level of grey of the current pixel with the levels of grey of the neighboring points;

calculating abscissa $x_c$ and ordinate $y_c$ of center C of the circle crossing current point $P_{xy}$, to which the gradient determined at the preceding step is tangent. Coordinates $x_c$ and $y_c$ can be deduced, from components $Grad_x$ and $Grad_y$ of the gradient and the equation of the circle of center C of radius $R_k$, as follows:

$$x_c(x, R_k) = x \pm \frac{R_k}{\sqrt{1 + \frac{Grad^2 y}{Grad^2 x}}}; \text{ and } y_c(y, R_k) = y \pm \frac{R_k}{\sqrt{1 + \frac{Grad^2 x}{Grad^2 y}}}.$$

The considered radius $R_k$ is sampled from a set of K possible radiuses of the previously defined circle.

incrementing by one unit the first accumulator at position $W_x(i)$ corresponding to abscissa $x_c$ of center C thus calculated; and incrementing by one unit the second accumulator at position $W_y(j)$ corresponding to ordinate $y_c$ of center C thus calculated. As an alternative, the increment may be an amount weighted according to the significance of the gradient at the current point $P_{xy}$ for which point C is the center of the circle of radius $R_k$ to which this gradient is tangent.

The successive operations of calculation of coordinates $x_c$ and $y_c$ are performed for each point $P_{xy}$ for each of the K possible values of radius $R_k$, for example, for a pupil between 30 and 100 pixels.

For a considered point $P_{xy}$, the only values to be stored are those of components $Grad_x$ and $Grad_y$ of the gradient and the content of the two accumulators $W_x$ and $W_y$. The two coordinates $x_c$ and $y_c$ of center C, recalculated for each radius $R_k$, need not be stored.

It is then successively controlled:

whether, for current point $P_{xy}$, all K radiuses have been processed (step 308, k=K?);

whether, for the considered line x, the M columns (or pixels) have been scanned (step 309, y=M?); and whether the last line N has been reached (step 310, x=N?).

As long as one of the preceding conditions 308, 309, 310 is not fulfilled (N), the corresponding counter of radius k is incremented (block 311, k=k+1), as well as the counter of column y (block 312, y=y+1) or of line x (block 313, x=x+1) and the appropriate sequence is resumed by returning either to the processing of the next radius by block 307, or to the processing of the point of the next column, from block 306, or to the processing of the next line, from block 305.

As the calculations advance, the two components $Grad_x$ and $Grad_y$ of the gradient are recalculated for each current point $P_{xy}$. When passing to a next point, the values associated with the preceding point are no longer necessary.

Thus, the same memory space can be used to store this parameter necessary to the K calculations of as many possible centers according to radiuses $R_k$. The same minimum memory space can thus be assigned to these buffer calculations for each change of current point. From one point to another, the only data to be kept are the contents of the two accumulators $W_x$ and $W_y$.

As illustrated in block 314, abscissa X0 of the approximate searched center C0 is the value for which the corresponding term $W_x(X0)$ of the first accumulator $W_x$ is maximum. Similarly, ordinate Y0 of point C0 is the point for which value $W_y(j)$ is maximum:

$W_x(X0)=Max(i=1 \ldots N)[W_x(i)]$, and $W_y(Y0)=Max(j=1 \ldots M)[W_y(j)]$.

Coordinates XO and Y0 of center C0 are accordingly obtained by determining, in each accumulator $W_x$ and $W_y$, the respective current positions i and j for which the respective values $W_x(i)$ and $W_y(j)$ are maximum.

FIG. 4B illustrates the result obtained at the end of step 314.

Figure 1:
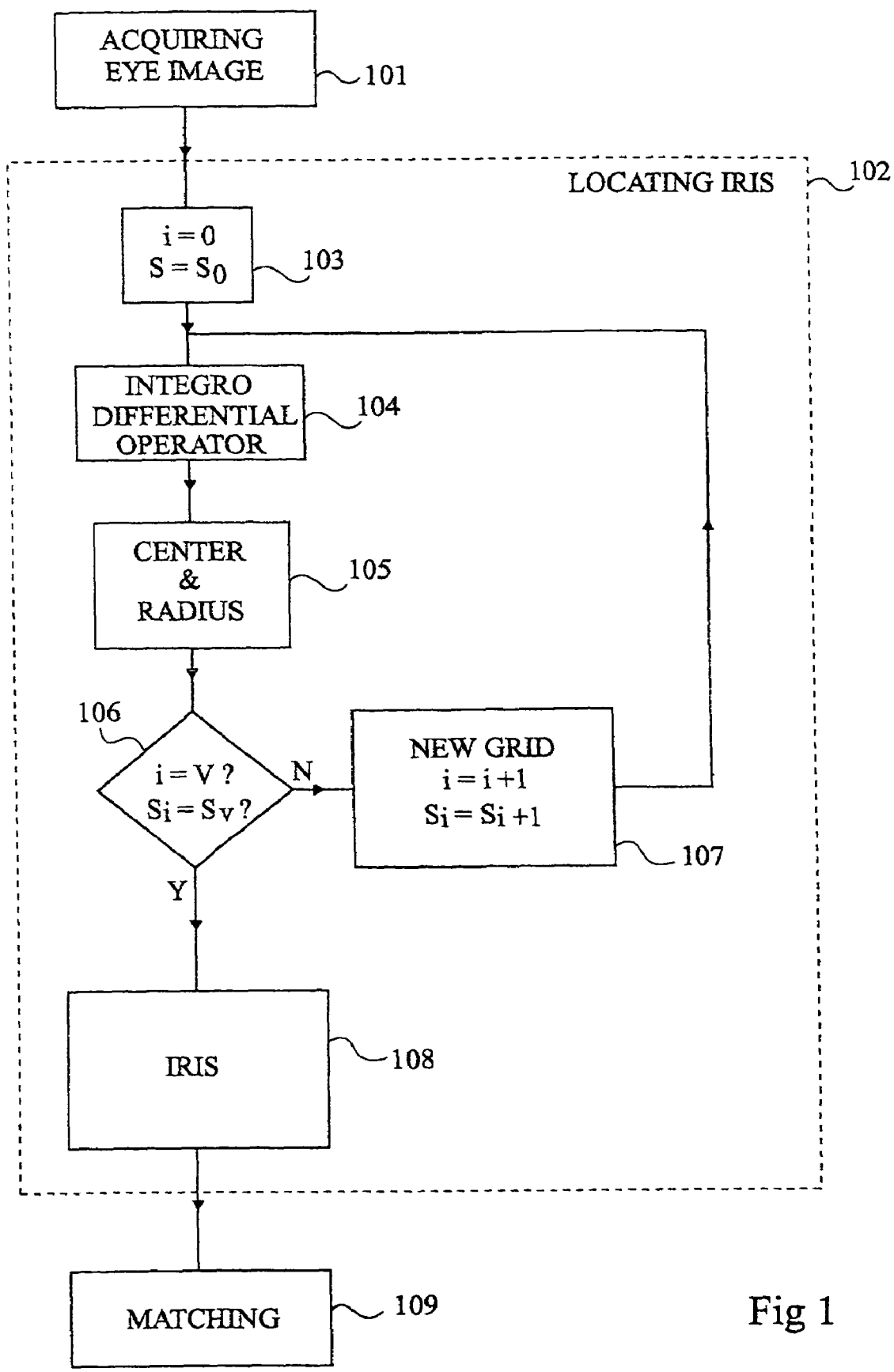
FIG. 1 illustrates in a flowchart the step sequence of a known iridian recognition method.

At the next step 315 (INTEGRO-DIFFERENTIAL OPERATORS AROUND (X0, Y0)), steps of searching the center and the radius of a circle are implemented based on integro-differential operators applied on a gate G of points representing possible centers. The searched circle is that of the pupil. As illustrated in FIG. 4C, grid G is, according to the present invention, of fine pitch (preferably, a minimum pitch, that is, 1 pixel) and is centered on previously-determined approximate center C0. This amounts to implementing steps 104 and 105 of the method of FIG. 1, but directly for final determination grid G. As an alternative, the execution of a few loops of the method of FIG. 1 according to the approximate center determination accuracy may be maintained. Grid G being already centered on approximate center C0, the determination of the exact center $C_P$ and radius $R_P$ of the pupil is particularly fast. Indeed, even if it is chosen to perform several runs, the number of successive grids, and thus the amount of calculation, is reduced as compared to the known method such as previously described. It should be noted that this exact determination of center $C_P$ and of radius $R_P$ of the pupil uses the same set of K possible values for the pupil radius as that previously defined and used to determine approximate center C0.

Once center $C_P$ and radius $R_P$ of the pupil have been determined, integro-differential operators are applied again on circles having their radiuses in a possible range of the average diameter of the iris of an eye to determine (block 316 (IRIS CENTER & BOUNDARIES) of FIG. 3; FIG. 4D) radius $R_I$ and center $C_I$ of the iris. As for the pupil, this determination preferentially uses a single grid with a minimum pitch. This grid is centered on center $C_P$ and its dimensions are a function of the maximum possible distance between centers $C_P$ and $C_I$, so that it necessarily includes center $C_I$.

The ring forming the eye iris has thus been precisely located. It can then be submitted to any appropriate processing, for example, a recognition processing by being compared to the content of a database (block 317, MATCHING).

The general time of localization of the ring forming the iris is considerably reduced as compared to conventional methods implementing for the entire image a series of successive grids of possible centers of decreasing dimensions and pitches. Further, the precision of this localization is maximum.

The iris localization method described in relation with FIGS. 3 and 4 generally enables locating by determination of its center and of its radiuses any elliptic geometric shape. In the very example of the locating of an iris, instead of considering the pupil and/or the iris as a perfect circle, these may be considered as having an elliptic shape, either upon determination of the approximate center—steps 303 to 314 of FIG. 3—or upon application 315 of the integro-differential operators which are then applied on arcs of an ellipse instead of on arcs of a circle.

Generally, the method according to the present invention applies to the locating by determination of their centers and radiuses of any number of elliptic geometric shapes, each geometric shape being strictly included in a geometric shape of greater perimeter, except for that having the greatest dimensions. Further, the searched elliptic shapes are concentric or slightly off-centered.

This localization method may be used to locate at least one ring included between at least two of the located geometric shapes. For example, in the wood working industry, it enables detecting the presence of knots in the wood in quality control tests. It is then also advantageously possible to measure their size, which enables determining their impact on the solidity of the final product.

In the previously-described iris localization application, the localization is previous to an iridian recognition usable as a recognition parameter to identify an individual. An example of application is the access control: access to a physical site, such as a control of the opening of a door with a code, or with an access card; access to a bank account usually protected with a password; access to any device such as a computer or a mobile phone usually protected by a code to be typed. Such a device may also replace the fingerprint identification or another biometric identification.

Of course, the present invention is likely to have various alterations, modifications, and improvement which will readily occur to those skilled in the art. In particular, it has been considered in FIG. 4 that the method starts with the acquisition of an eye image. However, it may start with the access in a database to a previously-digitized image. This image may then come from a distant database. In FIG. 4C, it has been assumed that center $C_P$ differs from approximate center C0. However, approximate center C0 could appear to be the searched center of the pupil. In the approximate center search algorithm, the image has been assumed to be scanned line by line. It should be clear to those skilled in the art that any other type of scanning, for example, column by column, would also be possible. Further, the loop control mode (line counter x, column counter y, radius counter k) may be modified in any appropriate manner. Moreover, instead of searching the center of the pupil as the approximate center, that of the iris could be searched, provided to appropriately modify the predefined set of possible values for the radius.

Further, the circle forming the limit with the strongest contrast, that is, that having the points with the highest gradient values, has approximately been located among searched circles of various possible radiuses. It would however be possible to attempt to determine the approximate center of another circle of lower contrast, for example, if said circle has a particularly reduced number of possible radiuses.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for localizing, in a digital image, at least two circles, one of which is entirely included in the other, the method comprising:
    estimating a position of a center of one of the two circles;
    centering a grid in a vicinity of the estimated position of the center, the grid being of reduced dimensions as compared to the image dimensions;
    determining a first radius and first coordinates of the center of the one of the two circles;
    determining a second radius and second coordinates of the center of another of the two circles based at least in part on the first radius and/or first coordinates of the center of the one of the two circles; and
    outputting an indication of the localization of the at least two circles.

2. The method of claim 1, using a single grid having a minimum pitch.

3. The method of claim 2, wherein one of the two circles is larger than another of the two circles, and wherein the maximum size of the grid is smaller than a size of the larger circle.

4. The method of claim 3, wherein the maximum size of the grid is smaller than a size of the circle forming the limit of strongest contrast.

5. The method of claim 3, wherein the maximum size of the grid is smaller than a size of the smaller circle.

6. The method of claim 1, wherein the step of estimating the position of the center includes:
    a) predefining a set of possible radiuses of the one of the two circles;
    b) sizing two one-dimension accumulators in a form of a column array of at most a size of an image in abscissa and of a line array of at most the image size in ordinate;
    c) successively, for each image pixel:
        (i) successively selecting each possible radius;
        (ii) evaluating the position of a possible center of a circle of the selected radius and a considered pixel of which is on the periphery; and
        (iii) incrementing the accumulators at the abscissa and ordinate of the possible center; and
    d) selecting, as coordinates of the located center, the abscissa and the ordinate corresponding to the maximum of the accumulators.

7. The method of claim 6, wherein incrementing the accumulators includes changing the accumulators by an increment of one.

8. The method of claim 6, wherein incrementing the accumulators includes changing the accumulators by an increment which is weighted according to the significance of the gradient at the considered pixel.

9. A method for localizing, in a digital image, a ring defined by the inclusion of a first circle of relatively small radius in a second circle of relatively large radius, consisting of localizing the first and second circles according to the method of claim 1.

10. The method of claim 9, wherein the ring represents an iris of an eye, the first center represents a pupil of the eye and the second circle represents a limit between the iris and a cornea of the eye.

11. The method of claim 10, wherein the pupil is the one of two circles.

12. A method of determining a position of a center of a circle in an image, the method comprising:
    estimating a position of a center of a circle in an image, the image having an image area;
    centering a grid around the estimated position of the center, the grid having a grid area that is less than the image area
    determining the actual position of the center of the circle within the grid; and
    providing an indication of the actual position of the center of the circle.

13. The method of claim 12, wherein the circle has a circle area and the circle area is smaller than the image area and is larger than the grid area.

14. The method of claim 12, further comprising determining an actual radius of the circle.

15. The method of claim 12, wherein said step of estimating a position of a center of a circle includes:
    a) determining a set of possible radiuses;
    b) determining a first one-dimension accumulator representing at most the number of lines of the image and a second one-dimension accumulator representing at most the number of columns of the image;
    c) selecting one radius from the set of possible radiuses;
    d) determining a gradient of a possible center of the circle;
    e) incrementing the first and second accumulators at the possible center;
    f) repeating steps c, d and e for each radius of the set of possible radiuses;
    g) repeating steps c, d, e and f for each possible center of the circle; and
    h) determining that the estimated position of the center of the circle is where the first and second accumulators are at a maximum.

16. The method of claim 15, wherein said step of determining a gradient of a possible center of the circle includes comparing a first level of gray of the possible center with a second level of gray of a neighboring point.

17. A method of determining positions of centers of first and second circles in an image, the method comprising:
    estimating a position of a center of a first circle in an image, the image having an image area;
    centering a first grid around the estimated position of the center, the first grid having a first grid area that is less than the image area;
    determining the actual position of the center of the first circle within the first grid;
    centering a second grid around the actual position of the center of the first circle, the second grid having a second grid area that is less than the image area;
    determining the actual position of the center of the second circle within the second grid; and
    outputting an indication of the positions of centers of the first and second circles in the image.

18. The method of claim 17, wherein the first circle is smaller than the second circle.

19. The method of claim 18, wherein the first circle is located within the second circle.

* * * * *

UNITED STATES PATENT AND TRADEMARK OFFICE
CERTIFICATE OF CORRECTION

PATENT NO. : 7,416,302 B2  
APPLICATION NO. : 10/489544  
DATED : August 26, 2008  
INVENTOR(S) : Christel-Loïc Tisse Page 1 of 1

It is certified that error appears in the above-identified patent and that said Letters Patent is hereby corrected as shown below:

Title Page, Item (75) Inventor: should read as follows: Christel-Loïc Tissue, Plan de Cuques (FR)

Signed and Sealed this

Fourth Day of November, 2008

JON W. DUDAS  
*Director of the United States Patent and Trademark Office*